US008639398B2

(12) United States Patent
Kim et al.

(10) Patent No.: US 8,639,398 B2
(45) Date of Patent: Jan. 28, 2014

(54) APPARATUS AND METHOD FOR AUTOMATICALLY GENERATING SATELLITE OPERATION PROCEDURE PARAMETERS

(75) Inventors: In-Jun Kim, Daejeon-si (KR); Byoung-Sun Lee, Daejeon-si (KR); Jae-Hoon Kim, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 231 days.

(21) Appl. No.: 13/307,358

(22) Filed: Nov. 30, 2011

(65) Prior Publication Data

US 2012/0158216 A1 Jun. 21, 2012

(30) Foreign Application Priority Data

Dec. 3, 2010 (KR) ........................ 10-2010-0122938

(51) Int. Cl.
*G01C 23/00* (2006.01)

(52) U.S. Cl.
USPC .......................... 701/3; 701/32.4; 342/357.45

(58) Field of Classification Search
USPC ............ 701/3, 32.4, 412, 468; 342/352, 355, 342/357.45
See application file for complete search history.

(56) References Cited

U.S. PATENT DOCUMENTS

| 5,893,044 A * | 4/1999 | King et al. ................... 701/478 |
| 7,542,829 B2 | 6/2009 | Lee et al. |
| 7,733,944 B2 * | 6/2010 | Twitchell et al. ............. 375/149 |

FOREIGN PATENT DOCUMENTS

| KR | 10-2003-0042091 | 5/2003 |
| KR | 10-2003-0056471 | 7/2003 |
| KR | 10-2004-0046686 | 6/2004 |

* cited by examiner

*Primary Examiner* — Gertrude Arthur Jeanglaude
(74) *Attorney, Agent, or Firm* — Staas & Halsey LLP

(57) ABSTRACT

An apparatus for automatically generating satellite operation procedure (SOP) parameters is provided. The apparatus includes a parameter extraction unit configured to extract one or more SOP parameters corresponding to an SOP; a transformation formula extraction unit configured to extract a transformation formula corresponding to the extracted SOP parameters; and a calculation unit configured to calculate values of the extracted SOP parameters based on property information for performing a satellite task and the extracted transformation formula.

13 Claims, 4 Drawing Sheets

FIG. 3

| EXAMPLE 1 | $DELAY_BEFORE_IMAGE = 00:05:00 |
| --- | --- |
| EXAMPLE 2 | $NUMBER_OF_IMAGES :=&IMAGING_NO |
| EXAMPLE 3 | $DATE_START_1 := &START +101 |
| EXAMPLE 4 | $DATE_IMAGE_1 := &Start_time |
| EXAMPLE 5 | $FWM_NB_POS_1 := &IMAGING_NO-2 |

FIG. 4

```
FILE_HEADER
FILE_TYPE :="ASCII"
GEN_DATE :="Mon Nov 29 16:48:47 GMT+01:00 2004"
GEN_PROCEDURE:= "IMAGE_PLAN_LOADING"
GEN_CREATOR:= "HONG GIL DONG"
END_FILE_HEADER
$DELAY_BEFORE_IMAGE :=00:05:00
$NUMBER_OF_IMAGES :=12
$DATE_START_1 := 20572
$DATE_IMAGE_1 := 15/08/2009 00:16:08
$FWM_NB_POS_1 :=10
```

APPARATUS AND METHOD FOR AUTOMATICALLY GENERATING SATELLITE OPERATION PROCEDURE PARAMETERS

CROSS-REFERENCE TO RELATED APPLICATION(S)

This application claims the benefit under 35 U.S.C. §119(a) of Korean Patent Application No. 10-2010-0122938, filed on Dec. 3, 2010, in the Korean Intellectual Property Office, the entire disclosure of which is incorporated herein by reference for all purposes.

BACKGROUND

1. Field

The following description relates to a technique to automatically generating parameter information for executing a satellite operation procedure that is for use in a satellite operation control system to operate a satellite.

2. Description of the Related Art

Satellite control is a process of monitoring and controlling the operation of a satellite, and includes receiving telemetry, including the status of health (SoH) of a satellite and the results of tasks performed by the satellite, during an access time, which is a period of time when the satellite and a satellite control system can communicate with each other, analyzing the telemetry, and transmitting appropriate commands from the satellite control system to the satellite.

A satellite control system may include at least one satellite operation system that operates one or more satellites in the space and a task analysis and planning system that analyzes and/or plans tasks to be performed by each of the satellites.

In accordance with rapid increases in the number of satellites and the ever-growing demand for the reduction of personnel for operating satellites and mistakes made by the personnel, the demand for automated real-time satellite operation systems has rapidly increased. For this reason, techniques to control the operation of a satellite by transmitting instructions to the satellite and monitoring the state of the satellite using a satellite operation procedure (SOP), which is a scenario of how to operate a satellite. An SOP may be a program written in a script language. To execute an SOP, various parameters regarding the execution of various satellite tasks may be needed.

Conventionally, satellite operators need to enter such various parameters before the to execution of an SOP or to use a certain parameter generation program for exclusive use for a certain satellite. Therefore, the necessity of techniques to easily generate all parameters necessary for the operation of a satellite has arisen.

SUMMARY

In one general aspect, there is provided an apparatus for automatically generating satellite operation procedure (SOP) parameters, the apparatus including a parameter extraction unit configured to extract one or more SOP parameters corresponding to an SOP; a transformation formula extraction unit configured to extract a transformation formula corresponding to the extracted SOP parameters; and a calculation unit configured to calculate values of the extracted SOP parameters based on property information for performing a satellite task and the extracted transformation formula.

The apparatus may also include a satellite task information extraction unit configured to extract satellite task information corresponding to a satellite task to be performed; and a property information extraction unit configured to extract the property information from the extracted satellite task information.

The apparatus may also include a satellite task information extraction unit configured to extract satellite task information corresponding to a satellite task to be performed; and an SOP extraction unit configured to extract an SOP corresponding to the extracted satellite task information.

The apparatus may also include a file generation unit configured to generate a parameter file including the extracted SOP parameters and the calculated values of the extracted SOP parameters.

The apparatus may also include a determination unit configured to determine whether all the values of the extracted SOP parameters have been calculated, wherein the file generation unit is further configured to generate the parameter file in response to all the values of the extracted SOP parameters having been calculated.

The apparatus may also include a task-SOP database (DB) configured to store one or more satellite tasks and one or more SOPs corresponding to the one or more satellite tasks.

The apparatus may also include an SOP-parameter DB configured to store the one or more satellite tasks and one or more SOP parameters corresponding to the one or more satellite tasks.

The apparatus may also include a parameter-transformation formula DB configured to store the one or more SOP parameters and one or more transformation formulas corresponding to the one or more SOP parameters.

In another general aspect, there is provided a method of automatically generating SOP parameters, the method including extracting one or more SOP parameters corresponding to an SOP; extracting a transformation formula corresponding to the extracted SOP parameters; and calculating values of the extracted SOP parameters based on property information for performing a satellite task and the extracted transformation formula.

The method may also include extracting satellite task information corresponding to a satellite task to be performed; and extracting the property information from the extracted satellite task information.

The method may also include extracting satellite task information corresponding to a satellite task to be performed; and extracting an SOP corresponding to the extracted satellite task information.

The method may also include generating a parameter file including the extracted SOP parameters and the calculated values of the extracted SOP parameters.

The method may also include determining whether all the values of the extracted SOP parameters have been calculated, wherein the generating of the parameter comprises generating the parameter file in response to all the values of the extracted SOP parameters having been calculated.

Other features and aspects may be apparent from the following detailed description, the drawings, and the claims.

BRIEF DESCRIPTION OF THE DRAWINGS

FIG. 3 is a table showing an example of various transformation formulas.

FIG. 4 is a diagram showing an example of a parameter file.

Figure 1:
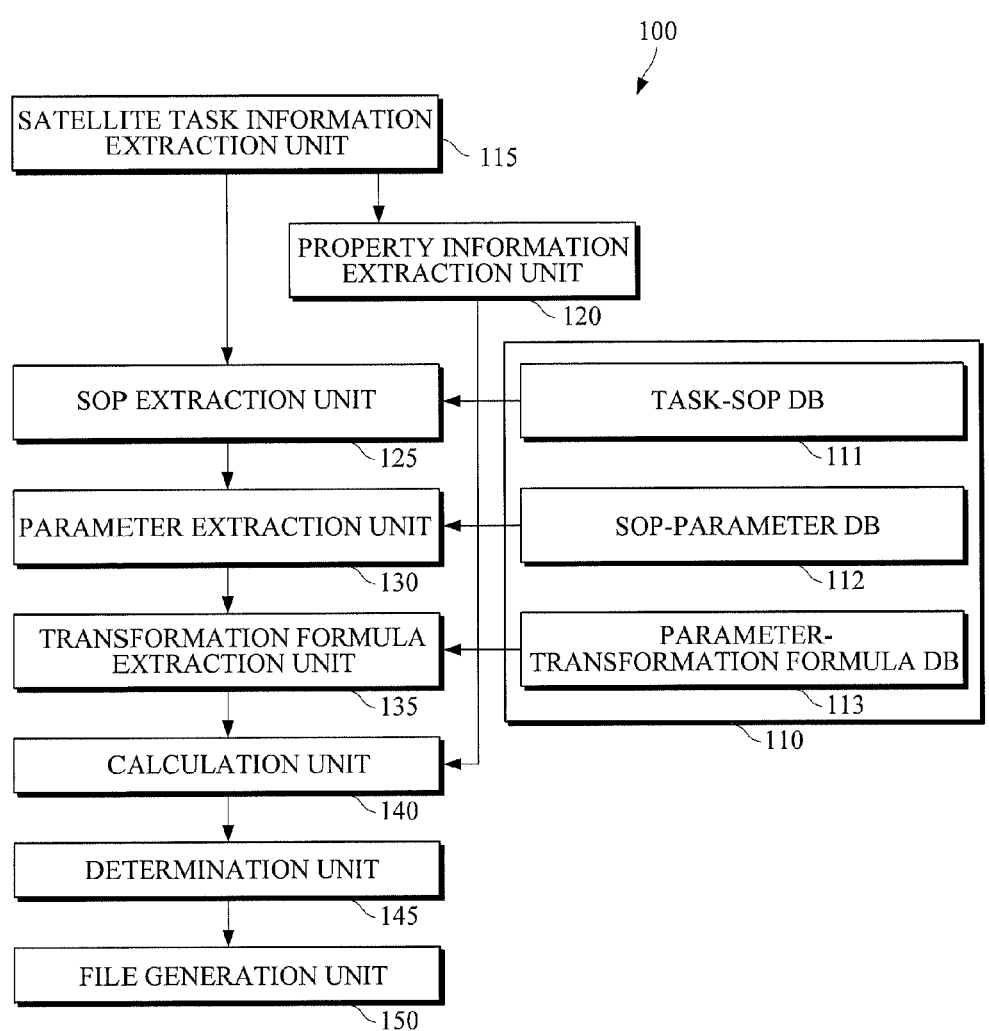
FIG. 1 is a diagram illustrating an example of an apparatus for automatically generating satellite operation procedure parameters.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

FIG. 1 illustrates an example of an apparatus for automatically generating satellite operation procedure (SOP) parameters.

Referring to FIG. 1, apparatus 100 may include a database (DB) 110, a satellite task information extraction unit 115, a property information extraction unit 120, an SOP extraction unit 125, a parameter extraction unit 130, a transformation formula extraction unit 135, a calculation unit 140, a determination unit 145, and a file generation unit 150.

The DB 110 may include a task-SOP DB 111, an SOP-parameter DB 112, and a parameter-transformation formula DB 113.

The task-SOP DB 111 may store one or more satellite tasks and one or more SOPs corresponding to the satellite tasks. The term 'satellite task,' as used herein, may indicate a task that should be performed by a satellite, such as photo capturing, orbit maneuvering, or the like. The term 'SOP,' as used herein, may indicate a scenario describing the procedure of the operation of a satellite. For example, the SOPs may be programs written in a script language.

There may be a one-to-one or one-to-many correspondence between the satellite tasks and the SOPs stored in the task-SOP DB 111. For example, satellite tasks 1 and 2, SOP 1 corresponding to satellite task 1, and SOPs 2-1 and 2-2 corresponding to satellite task 2 may be stored in the task-SOP DB 111.

The SOP-parameter DB 112 may store one or more SOPs and one or more SOP parameters corresponding to the SOPs. There may be a one-to-one or one-to-many correspondence between the SOPs and the SOP parameters stored in the SOP-parameter DB 112. For example, SOPs 1 and 2, a plurality of SOP parameters 1-1 through 1-n corresponding to SOP 1, and a plurality of SOP parameters 2-1 through 2-m corresponding to SOP 2 may be stored in the SOP-parameter DB 112. The term 'SOP parameter,' as used herein, may indicate information necessary for performing an operation specified in an SOP.

The parameter-transformation formula DB 113 may store one or more SOP parameters and one or more transformation formulas respectively corresponding to the SOP parameters. For example, SOP parameters 1 and 2 and transformation formulas 1 and 2 respectively corresponding to SOP parameters 1 and 2 may be stored in the parameter-transformation formula DB 113. Each of the transformation formulas stored in the parameter-transformation formula DB 113 may include property information.

The information stored in the DB 110 may be entered by a satellite operator or may be updated with information that is received from an external storage device at regular intervals of time set by the apparatus 100.

The satellite task information extraction unit 115 may extract satellite task information. For example, the satellite task information extract unit 115 may extract satellite task information from an SOP that includes one or more satellite tasks and property information for performing each of the satellite tasks and is received from a satellite task planning system (not shown).

The property information extraction unit 120 may extract property information included in the extracted satellite task information. The property information may be information necessary for performing each satellite task, and may be set by the satellite task planning system or the satellite operator. For example, the property information may include photo capturing time information, photo capturing mode information, photo capturing angle information, and satellite attitude information, and the like.

For example, the property information extraction unit 120 may extract a plurality of pieces of property information 1-1 through 1-n corresponding to first satellite task information or a plurality of pieces of property information 2-1 through 2-m corresponding to second satellite task information.

The SOP extraction unit 125 may extract an SOP corresponding to the extracted satellite task information. For example, in response to the first satellite task information being extracted, the SOP extraction unit 125 may extract SOP 1 corresponding to the first satellite task information from the task-SOP DB 111.

The parameter extraction unit 130 may extract one or more SOP parameters corresponding to the extracted SOP. An SOP parameter is a type of parameter for executing an SOP, which is a script program, and may be generated based on property information. For example, in response to SOP 1 being extracted, the parameter extraction unit 130 may extract SOP parameters 1-1 through 1-n from the SOP-parameter DB 112.

The transformation formula extraction unit 135 may extract a transformation formula corresponding to the extracted SOP parameter(s). For example, in response to a first SOP parameter being extracted, the transformation formula extraction unit 135 may extract a first transformation formula corresponding to the first SOP parameter from the parameter-transformation formula DB 113. The first transformation formula may be a formula for calculating the first SOP parameter.

The calculation unit 140 may calculate the values of the extracted parameters using property information and the extracted transformation formula. For example, the calculation unit 140 may calculate the value of the first SOP parameter using the first transformation formula corresponding to the first SOP parameter and first property information extracted by the property information extraction unit 120. For example, the first transformation formula may be defined as follows: First SOP parameter=First Property Information+ 12. The first transformation formula may be defined using various arithmetic operations, various logic operations, various functions, various script programs, and the like. More than one piece of property information may be used to calculate the value of a single SOP parameter.

The determination unit 145 may determine whether all the values of the SOP parameters extracted by the parameter extraction unit 130 have been calculated. In response to not all the values of the SOP parameters extracted by the parameter extraction unit 130 having yet been calculated, the calculation unit 140 may continue to calculate the values of extracted SOP parameters whose values are yet to be calculated.

On the other hand, in response to all the values of the extracted SOP parameters having been calculated, the file generation unit 145 may generate a parameter file including the extracted SOP parameters and the calculated values of the extracted SOP parameters. For example, the file generation unit 150 may generate a parameter file including the following equations: First SOP Parameter=10; and Second SOP Parameter=1253. The generated parameter file may be input to an SOP execution apparatus (not shown), and the SOP execution apparatus may perform a satellite task based on the generated parameter file and an SOP corresponding to the satellite task.

According to the example illustrated in FIG. 1, the apparatus 100 may automatically generate one or more SOP parameters for each satellite based on property information and a transformation formula without the need for the satellite operator to perform additional processes. In addition, in a case in which a new satellite task is added, the satellite operator may simply need to store an SOP and a transformation formula corresponding to the new satellite task in the apparatus 100, and then, the apparatus 100 may automatically generate SOP parameter information for performing the new satellite task.

Figure 2:
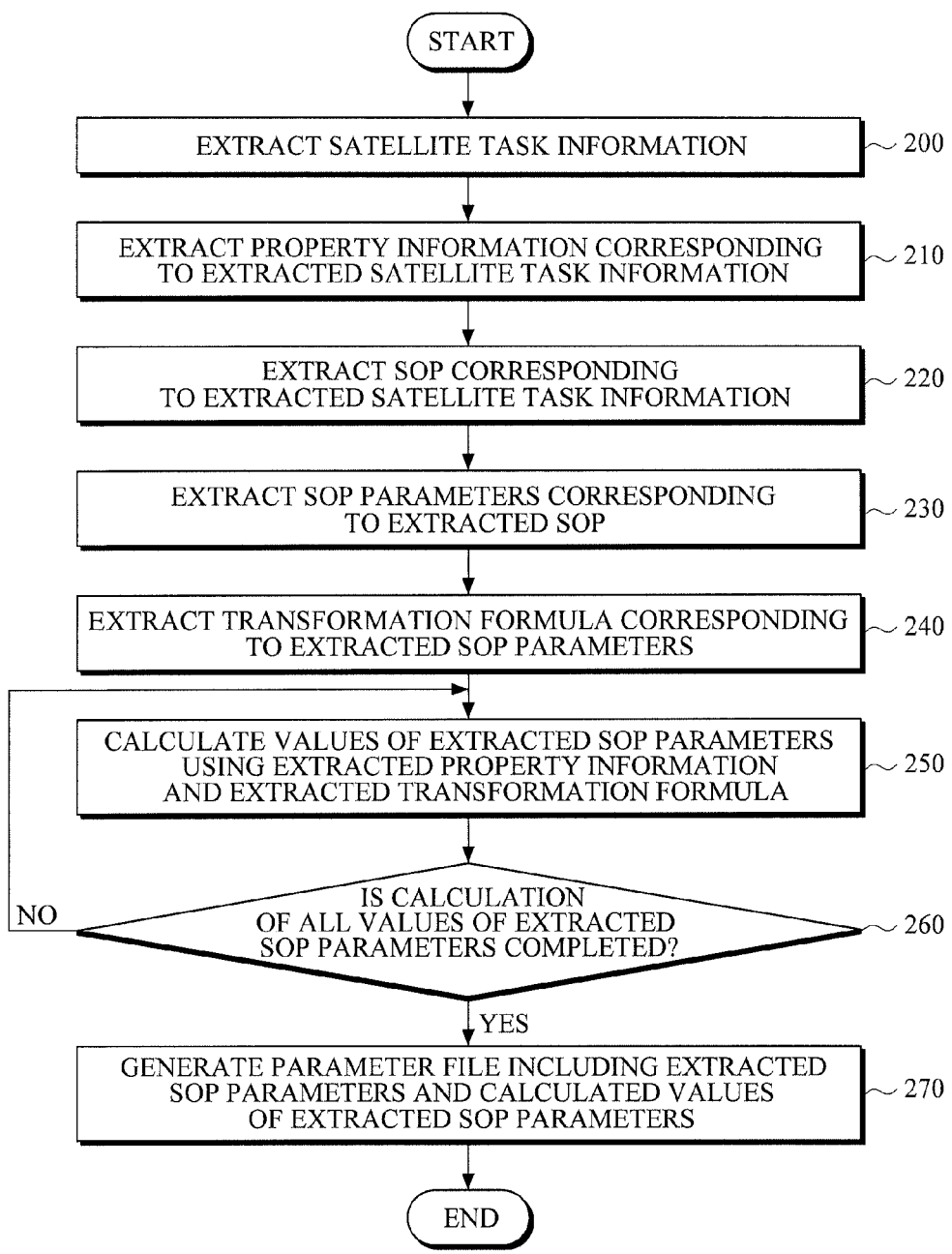
FIG. 2 is a flowchart illustrating an example of a method of automatically generating satellite operation procedure parameters.

FIG. 2 illustrates an example of a method of automatically generating SOP parameters.

Referring to FIG. 2, in 200, an apparatus for automatically generating SOP parameters may extract satellite task information. In 210, the apparatus may extract property information corresponding to the extracted satellite task information. In 220, the apparatus may extract an SOP corresponding to the extracted satellite task information. In 230, the apparatus may extract one or more SOP parameters corresponding to the extracted SOP. In operation 240, the apparatus may extract a transformation formula corresponding to the extracted SOP parameters. In 250, the apparatus may calculate the values of the extracted SOP parameters using the extracted transformation formula. In 260, the apparatus may determine whether all the values of the extracted SOP parameters have been calculated. In response to not all the values of the SOP parameters extracted by the parameter extraction unit 130 having yet been calculated, the method returns to 250. On the other hand, in 270, in response to all the values of the extracted SOP parameters having been calculated, the apparatus may generate a parameter file including the extracted SOP parameters and the calculated values of the extracted SOP parameters.

According to the example illustrated in FIG. 2, it is possible to automatically generate one or more SOP parameters for each satellite based on property information and a transformation formula without the need for a satellite operator to perform additional processes.

FIG. 3 illustrates an example of various transformation formulas.

Referring to FIGS. 1 and 3, each of five transformation formulas may include an SOP parameter and property information. Referring to FIG. 3, symbol '$' represents an SOP parameter, and symbol '&' represents property information. The calculation unit 140 may calculate the values of SOP parameters using a transformation formula.

FIG. 4 illustrates an example of a parameter file.

Referring to FIGS. 1 and 4, the file generation unit 150 may generate a parameter file including a plurality of SOP parameters and the values of the SOP parameters. Referring to FIG. 4, symbol '$' represents an SOP parameter. Referring to FIG. 4, a parameter file may include file type information, file generation date information, file creator information, a plurality of SOP parameters and the values of the SOP parameters.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for automatically generating satellite operation procedure (SOP) parameters, the apparatus comprising:
   a parameter extraction unit configured to extract one or more SOP parameters corresponding to an SOP;
   a transformation formula extraction unit configured to extract a transformation formula corresponding to the extracted SOP parameters; and
   a calculation unit configured to calculate values of the extracted SOP parameters based on property information for performing a satellite task and the extracted transformation formula.

2. The apparatus of claim 1, further comprising:
   a satellite task information extraction unit configured to extract satellite task information corresponding to a satellite task to be performed; and
   a property information extraction unit configured to extract the property information from the extracted satellite task information.

3. The apparatus of claim 1, further comprising:
   a satellite task information extraction unit configured to extract satellite task information corresponding to a satellite task to be performed; and
   an SOP extraction unit configured to extract an SOP corresponding to the extracted satellite task information.

4. The apparatus of claim 1, further comprising:
a file generation unit configured to generate a parameter file including the extracted SOP parameters and the calculated values of the extracted SOP parameters.

5. The apparatus of claim 4, further comprising:
a determination unit configured to determine whether all the values of the extracted SOP parameters have been calculated,
wherein the file generation unit is further configured to generate the parameter file in response to all the values of the extracted SOP parameters having been calculated.

6. The apparatus of claim 1, further comprising:
a task-SOP database (DB) configured to store one or more satellite tasks and one or more SOPs corresponding to the one or more satellite tasks.

7. The apparatus of claim 1, further comprising:
an SOP-parameter DB configured to store the one or more satellite tasks and one or more SOP parameters corresponding to the one or more satellite tasks.

8. The apparatus of claim 1, further comprising:
a parameter-transformation formula DB configured to store the one or more SOP parameters and one or more transformation formulas corresponding to the one or more SOP parameters.

9. A method of automatically generating SOP parameters, the method comprising:
extracting one or more SOP parameters corresponding to an SOP;
extracting a transformation formula corresponding to the extracted SOP parameters; and
calculating values of the extracted SOP parameters based on property information for performing a satellite task and the extracted transformation formula.

10. The method of claim 9, further comprising:
extracting satellite task information corresponding to a satellite task to be performed; and
extracting the property information from the extracted satellite task information.

11. The method of claim 9, further comprising:
extracting satellite task information corresponding to a satellite task to be performed; and
extracting an SOP corresponding to the extracted satellite task information.

12. The method of claim 9, further comprising:
generating a parameter file including the extracted SOP parameters and the calculated values of the extracted SOP parameters.

13. The method of claim 12, further comprising:
determining whether all the values of the extracted SOP parameters have been calculated,
wherein the generating of the parameter comprises generating the parameter file in response to all the values of the extracted SOP parameters having been calculated.

* * * * *